United States Patent [19]

Herbst et al.

[11] 4,417,506
[45] Nov. 29, 1983

[54] HOME COOKING APPLIANCE

[75] Inventors: Walter B. Herbst, Evanston; John Wolens, Chicago, both of Ill.

[73] Assignee: Housewares Research Associates, Chicago, Ill.

[21] Appl. No.: 304,806

[22] Filed: Sep. 23, 1981

[51] Int. Cl.³ .............................................. A47J 27/00
[52] U.S. Cl. ........................................ 99/348; 366/205
[58] Field of Search ................ 99/348; 366/199, 205, 366/206, 314, 247, 245, 249, 251; 241/36

[56] References Cited

U.S. PATENT DOCUMENTS

| | | | |
|---|---|---|---|
| 3,005,399 | 10/1961 | Libson | 99/348 |
| 3,635,147 | 1/1972 | Lee | 99/348 |
| 3,884,135 | 5/1975 | Lohr | 99/348 |
| 3,920,228 | 11/1975 | Klauk | 99/348 |
| 4,034,918 | 7/1977 | Culbertson | 241/36 |

Primary Examiner—Robert W. Jenkins
Attorney, Agent, or Firm—Hosier, Niro & Daleiden

[57] ABSTRACT

A home cooking appliance is disclosed having an elongated stir member removably disposed adjacent the bottom of the cooking vessel for automatically mixing and stirring foods being cooked in the appliance.

7 Claims, 5 Drawing Figures

U.S. Patent  Nov. 29, 1983  4,417,506
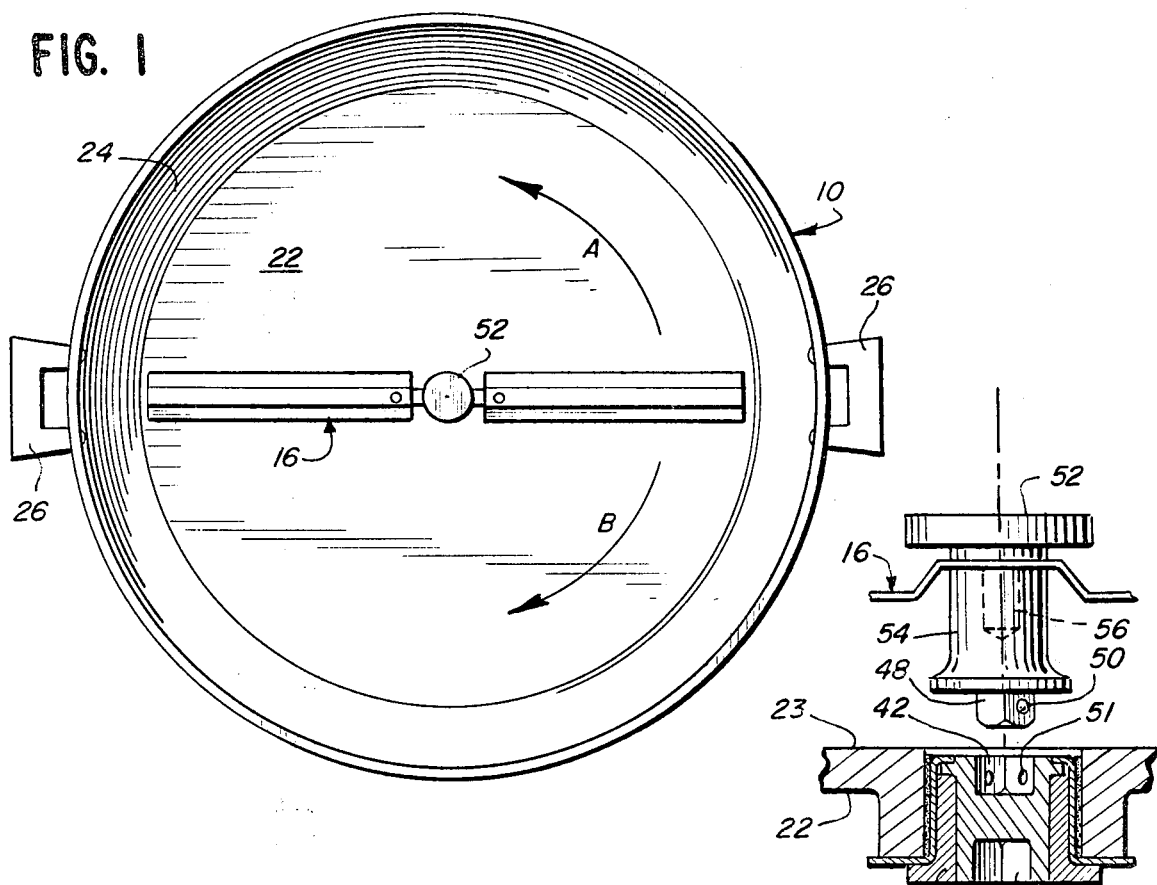
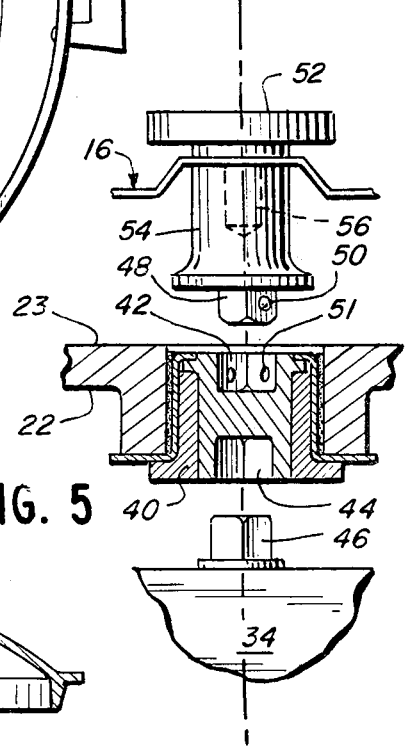
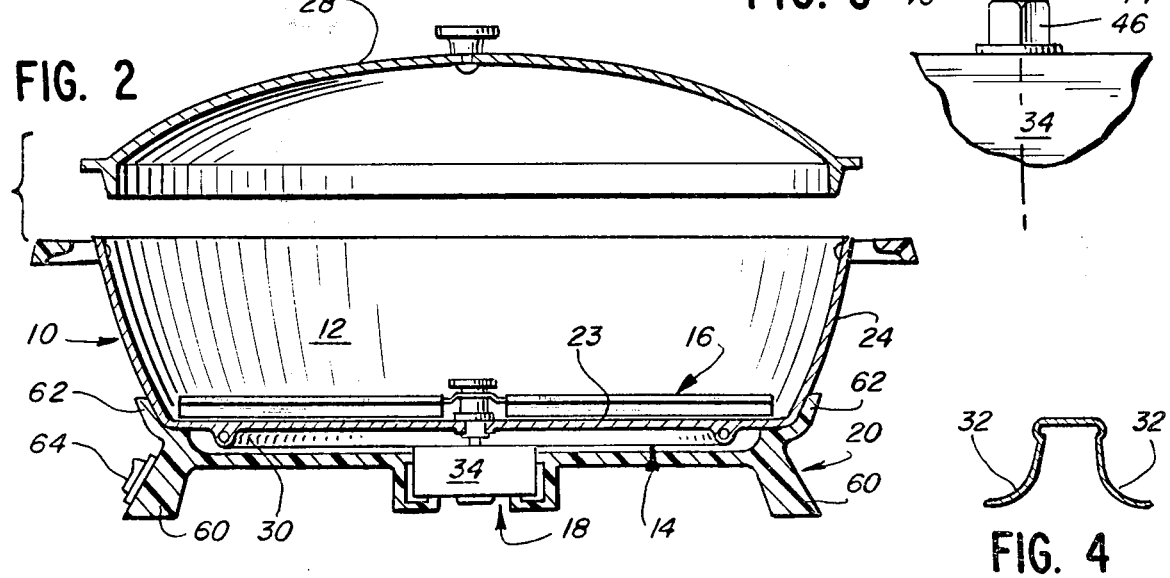
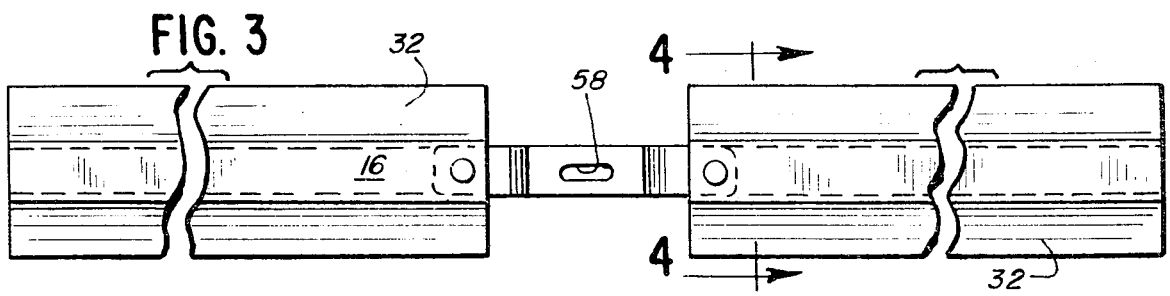

HOME COOKING APPLIANCE

BACKGROUND OF THE INVENTION

The present invention pertains to cooking appliances and, more particularly, to a cooking appliance for use in the home wherein an automatic stirring function is provided. The invention finds suitable application in electrical counter-top fryers, skillets, small ovens and other small cooking vessels wherein the foods being cooked require intermittent or continuous stirring.

In recent years, a wide variety of counter-top cooking appliances have been developed to facilitate the cooking of foods in the home. While such appliances have resulted in greatly enhancing the ease and convenience of home cooking, they have not adequately addressed the problems encountered when foods are cooked that require stirring or mixing during the cooking process. As a result, when such foods are being prepared the person attending the appliance must remain at or near the cooking station to perform this function manually.

SUMMARY OF THE INVENTION

The present invention, therefor, is directed to a home cooking appliance which overcomes the deficiency in prior art appliances with regard to the automation of the stirring function. The home cooking appliance of the present invention includes a vessel for containing the food to be cooked, a means for heating the vessel, an elongated stir member disposed within the vessel adjacent its bottom wall and means for rotating the stir member in a plane parallel and adjacent to the bottom of the vessel. In accord with one preferred embodiment of the invention, the rotating means also includes means for reversing the direction of rotation of the stir member whenever the stir member encounters an obstruction on the cooking surface of the appliance.

It is, accordingly, an object of the present invention to provide an improved home cooking appliance having automated stirring apparatus that will stir foods as required during the cooking process.

Another object of the invention is to provide a home cooking appliance that may be used with equal facility with or without the automated stirring apparatus in operation.

A still further object of the invention is to provide a home cooking appliance having automated stirring apparatus wherein the cooking vessel may be conveniently separated from the stirring apparatus and the electrical circuitry used to power the stirring apparatus to thereby facilitate serving of the foods cooked in the appliance and cleaning of the appliance.

Another object of the invention is the provision of a cooking appliance suitable for counter-top use within the home having an automated stirring apparatus that is self-reversing and configured to turn foods as they are cooked in the appliance.

BRIEF DESCRIPTION OF THE DRAWING

The invention is described with particularity in the appended claims. However, further objects and features of the invention together with its attendant advantages will be more readily understood by reference to the following description, taken in connection with the drawings in which like reference numbers refer to like structural elements and in which:

FIG. 1 is a plan view illustrating the home cooking appliance of the present invention with its lid removed;

FIG. 2 is a cross-sectional view of the home appliance of FIG. 1 with the lid of the appliance raised slightly from the closed position;

FIG. 3 is a plan view of a preferred stir member used in the appliance illustrated in FIGS. 1 and 2;

FIG. 4 is a cross-sectional view taken along line 4—4 of FIG. 3; and

FIG. 5 is an enlarged exploded view, in partial cross-section, showing details of one preferred embodiment of a drive means and drive train suitable for use in the practice of the present invention.

DETAILED DESCRIPTION OF THE INVENTION

Referring to the drawings, and specifically FIGS. 1 and 2, an improved home cooking appliance 10 is shown, including a vessel 12, a heating element 14, a stir member 16, a drive means 18 and a stand 20.

The vessel 12 may be constructed in any of a variety of configurations. However, for reasons explained below, it is preferred that vessel 12 be circular as shown in the drawing, having a bottom wall 22 and an upstanding side wall 24. Vessel 12 may also include insulated handles 26 to facilitate moving the vessel when heated. A lid 28 is also provided as is conventional for such appliances. Both vessel 12 and lid 28 may be constructed from materials used for such purposes, such as stainless steel, copper, cast aluminum glass and ceramics.

Means for heating vessel 12 is provided and, in the illustrated embodiment, is shown as an electrically energized heating element 30 which may be an integral component in bottom wall 22. Alternatively, a heating element may be supported in stand 20 and positioned to abut against the bottom wall of vessel 12.

In accordance with the present invention, the appliance is provided with means for stirring or mixing the food as it rests on the cooking surface 23 of bottom wall 22 during the cooking process. In the illustrated embodiment, a stir member 16 is disposed within vessel 12 and is adapted to rotate about its center point in a plane parallel and adjacent to cooking surface 23. Preferably, the stir member 16 is elongated and extends across substantially the entire diameter of the vessel 12 so that it traverses substantially the entire cooking surface of the bottom wall 22 during its rotational cycle. Alternatively, the stir member may be of a radial design, rotating about one of its ends located at the center of vessel with its free end extending to the side wall 24. Once again, the stir member would thereby traverse the entirety of the cooking surface as it rotates through 360°. It will be appreciated that a circular vessel is preferable in that virtually the entirety of the cooking surface is accessible to the rotating stir member, thus assuring that all of the food in the vessel will be properly mixed or stirred during cooking.

The stir member 16 includes opposed faces 32 which are configured to turn the food as the stir member traverses the cooking surface. In the illustrated embodiment the faces 32 are curved and diverge outwardly at the base of the stir member. This design has been found to suitably turn and stir a variety of food products. The stir member as shown is constructed from resilient sheet metal, but many other materials including heat resistant plastics would also be useful. It may also be desirable to coat the stir member with a stick-resistant material such as TEFLON.

The home cooking appliance of the present invention also includes drive means for rotating the stir member such as electric motor 34. Preferably, the drive means will rotate the stir member 12 at a rate of between about 2–20 revolutions per minute. The drive means is located external to and below the vessel 12 and is designed to removably engage the stir member 16 as is described in greater detail below. In accordance with a particularly preferred embodiment of the invention, the drive motor 34 is of the self-reversing type such as the 120 volt A.C., 3.5 watt, 50–60 Hz, Model 60-3 manufactured by Kingston. Reversible drive means of this arrangement, illustrated by arrows A and B in FIG. 1, will enhance the stirring function of the cooking appliance by automatically reversing the direction of the stir member in those rare instances when an obstruction is present on the cooking surface. "Obstruction" in the context of the present invention is meant to include any obstacle—such as an encrusted food particle—which is capable of stopping the stir member when under the power of drive means 18.

FIG. 5 illustrates one preferred embodiment for the drive train which rotates stir member 16. In accord with this embodiment, a bearing 40 is mounted in sealed relation at the center of bottom wall 22 and includes upper and lower recesses, 42 and 44 respectively. A variety of materials, such as heat resistant silicone adhesives, or other common sealing techniques such as "o" rings will be readily apparent to those skilled in the art for assisting in the sealing of bearing 40 in bottom wall 22.

Motor 34 has an output shaft 46 having a size and configuration to removably mate with lower bearing recess 44; while stir member 16 includes a depending stem 48 again having a size and configuration to removably mate with upper bearing recess 42. The stem 48 also includes retaining means, such as spring biased detent 50 that cooperates with recess 51, to hold the stir member 16 in its proper operating position immediately adjacent the cooking surface of bottom wall 22 during the cooking process.

As further illustrated in FIG. 5, the stir member may also include a small knob 52 to facilitate its removal from vessel 12. The knob 52 is supported on cylindrical hub 54 which also supports the stir member. Key 56 cooperates with slot 58 to fix the position of the stir member relative to stem 48. The knob may also be mounted on a shaft which extends above the usual food level for convenience in removing the stir member. Alternatively, the knob 52 may be mounted on a telescoping shaft to permit positioning of the knob above any food contained in vessel 12.

Finally, the home cooking appliance 10 includes a stand 20, preferably molded from heat resistant plastic, which supports the vessel 12 during the cooking process. Stand 20 includes feet 60 which provide adequate spacing and ventilation for drive means 18. Stand 20 also includes a locating flange 62 or other structure to properly position vessel 12 and align the output shaft 46 with lower bearing recess 44. A switch 64 is also provided on stand 20 for control of the electrical circuitry (not shown) used to power both the heating element 30 and the drive means 18. In this regard, the electrical circuitry may provide for variable speed adjustment or intermittent rotation of the stir member 16.

It will be apparent to those skilled in the art that the present invention provides a unique home cooking appliance which obviates the need for personal attention to cooking processes requiring mixing or stirring. The self-stirring appliance disclosed herein is capable of mixing and turning foods at the cooking surface of the appliance and is ideally suited for preparing sauteed and fried vegetables, browned meats, sauces, scrambled eggs and numerous other foods. In addition, due to the design of the stir member and drive train, the appliance may be used as a conventional cooking utensil without the stir member. The two-piece vessel and stand design also permits the vessel to be used separately as a serving piece and facilitates cleaning the vessel which may be completely immersed during washing.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A home cooking appliance comprising:
   a vessel for containing food to be cooked and having a bottom wall and an upstanding side wall;
   means for heating said vessel to raise food within said vessel to cooking temperatures;
   an elongated stir member removably disposed within said vessel adjacent said bottom wall;
   drive means for rotating said stir member in a plane parallel and adjacent to said bottom wall; and
   a stand to removably receive and support said vessel, said stand also housing said drive means and being configured to align said vessel and said drive means when said vessel is properly positioned within said stand.

2. The home cooking appliance of claim 1 wherein said drive means includes means for reversing the direction of rotation of said stir member whenever said stir member encounters an obstruction on the cooking surface of said bottom wall.

3. The home cooking appliance of claim 1 wherein said stir member includes opposed faces configured to turn the food encountered by said stir member as it traverses the bottom wall of said vessel.

4. The home cooking appliance of claim 3 wherein the faces of said stir member have curved surfaces and diverge outwardly at the base of said stir member.

5. The home cooking appliance of claim 1 wherein a rotatable bearing is mounted in sealed relation in said bottom wall and includes upper and lower recesses; said drive means comprises a motor disposed below said vessel and having an output shaft removably matable with said bearing lower recess; and said stir member includes a depending stem removably matable with said bearing upper recess.

6. The home cooking appliance of claim 5 wherein the depending stem of said stir member includes means for retaining said stem in mated relationship with said upper recess.

7. A home cooking appliance comprising:
   a circular vessel for containing food to be cooked and having a bottom wall and an annular upstanding side wall;
   electrically energized means for heating said vessel to raise food within said vessel to cooking temperatures;

an elongated stir member extending across a portion of the bottom wall of said vessel and removably disposed adjacent the bottom wall of said vessel;

drive means for rotating said stir member about its center in a plane parallel and adjacent to said bottom wall whereby said stir member traverses substantially the entire cooking surface of said bottom wall;

said drive means being positioned external to and below said vessel and being operatively and removably connected to said stir member by a bearing mounted in sealed relation in the bottom wall of said vessel; and a stand to removably receive and support said vessel, said stand also housing said drive means and being configured to align said vessel and said drive means when said vessel is properly positioned within said stand.

* * * * *